Patented Oct. 9, 1928.

1,686,930

UNITED STATES PATENT OFFICE.

ERNST ROTHLIN AND FRITZ MÜLLER, OF BASEL, SWITZERLAND, ASSIGNOR TO THE FIRM CHEMICAL WORKS FORMERLY SANDOZ, OF BASEL, SWITZERLAND.

EMETINE DERIVATIVES FOR THERAPEUTICAL PURPOSES.

No Drawing. Application filed December 22, 1927, Serial No. 242,007, and in Switzerland January 12, 1927.

It has been found that new and valuable emetine salts as well as salts of other cephaeline alkylethers can be obtained by coupling these alkaloids with bile acids to form bile acid salts. As bile acids glycocholic, taurocholic, cholic, desoxycholic, apocholic, dehydrocholic and choleinic acid may enter into consideration.

The preparation of these new salts may easily be carried out, if these acids and the bases are allowed to interact in molecular proportions or by double decomposition of suitable salts of the original materials.

The new salts possess a stronger antiparasitic action than the known ones. They constitute in general slightly yellowish powders, easily soluble in alcohol and methanol, more difficultly soluble in acetone and ether, nearly insoluble in water.

The following examples illustrate the invention:

*Example 1.*—5,5 g. of emetine and 4,3 g. of cholic acid are combined in an alcoholic solution. As soon as the substances are dissolved the solvent is evaporated and the frothy residue dried in vacuo at elevated temperature. The slightly yellowish cholate of emetine is easily soluble in alcohol, methanol and chloroform, more difficultly in acetone and ether, and nearly insoluble in water. It possesses a strong antiparasitic action.

*Example 2.*—6,3 g. of emetine hydrobromide are dissolved in 150 ccm. of water and dropped, whilst stirring, into a solution of 4,5 g. of sodium cholate. The pasty salt thus precipitated is dissolved in a small quantity of alcohol, the solvent is distilled off and the residue dried as stated above.

*Example 3.*—6,3 g. of emetine hydrobromide is allowed to interact with 4,3 g. of sodium desoxycholate as described in example 1. The desoxycholate of emetine, a slightly yellowish powder, is worked up in an analogous manner and possesses the same solubility properties as emetine cholate.

*Example 4.*—5,6 g. of cephaeline ethylether is allowed to interact with 4,3 g. of cholic acid. The cholate of cephaeline ethylether is a slightly yellowish powder, possessing the same solubility properties as emetine cholate.

What we claim is:

1. As new articles of manufacture, bile acid salts of cephaeline alkylethers, being slightly yellowish powders, easily soluble in alcohol and methanol, more difficultly soluble in acetone and ether, nearly insoluble in water and possessing a strong antiparasitic action.

2. As new articles of manufacture, salts of saponified bile acids of cephaeline alkylethers, being slightly yellowish powders, easily soluble in alcohol and methanol, more difficultly soluble in acetone and ether, nearly insoluble in water and possessing a strong antiparasitic action.

3. As new articles of manufacture, salts of cholic acid of cephaeline alkylethers, being slightly yellowish powders, easily soluble in alcohol and methanol, more difficultly soluble in acetone and ether, nearly insoluble in water and possessing a strong antiparasitic action.

4. As a new article of manufacture, the cholate of emetine, constituting a slightly yellowish powder, easily soluble in alcohol and methanol, more difficultly soluble in acetone and ether, nearly insoluble in water and possessing a strong antiparasitic action.

In witness whereof we have hereunto signed our names this 12th day of December, 1927.

ERNST ROTHLIN.
FRITZ MÜLLER.